(12) United States Patent
Hosoi

(10) Patent No.: US 7,756,265 B2
(45) Date of Patent: Jul. 13, 2010

(54) ON-BOARD HANDS-FREE COMMUNICATION APPARATUS

(75) Inventor: Toshihiro Hosoi, Nagoya (JP)

(73) Assignee: DENSO Corporation, Kariya (JP)

( * ) Notice: Subject to any disclaimer, the term of this patent is extended or adjusted under 35 U.S.C. 154(b) by 377 days.

(21) Appl. No.: 12/012,983

(22) Filed: Feb. 4, 2008

(65) Prior Publication Data

US 2008/0187128 A1    Aug. 7, 2008

(30) Foreign Application Priority Data

Feb. 7, 2007    (JP)    ............................. 2007-027960

(51) Int. Cl.
*H04M 1/00*    (2006.01)
(52) U.S. Cl. ............................. 379/388.02; 379/390.01; 379/392; 379/392.01
(58) Field of Classification Search ................. 379/388.01–392.01
See application file for complete search history.

(56) References Cited

U.S. PATENT DOCUMENTS

| | | | | |
|---|---|---|---|---|
| 4,225,754 A | * | 9/1980 | Bernard et al. | 379/388.04 |
| 4,600,815 A | * | 7/1986 | Horna | 379/406.08 |
| 4,629,829 A | * | 12/1986 | Puhl et al. | 455/570 |
| 4,747,132 A | * | 5/1988 | Ibaraki et al. | 379/406.12 |
| 5,359,656 A | * | 10/1994 | Kim | 379/406.08 |
| 5,646,990 A | * | 7/1997 | Li | 379/406.08 |
| 5,692,042 A | * | 11/1997 | Sacca | 379/390.01 |
| 6,771,769 B2 | * | 8/2004 | Erving et al. | 379/388.07 |
| 7,006,624 B1 | * | 2/2006 | Philipsson et al. | 379/388.03 |
| 2005/0286714 A1 | | 12/2005 | Tokuda | |

FOREIGN PATENT DOCUMENTS

| | | |
|---|---|---|
| JP | 2005-198093 | 7/2005 |
| JP | 2006-033802 | 2/2006 |

* cited by examiner

*Primary Examiner*—Simon Sing
(74) *Attorney, Agent, or Firm*—Harness, Dickey & Pierce, PLC

(57) ABSTRACT

In an on-board hands-free communication apparatus, a gain of an amplifier of a speaker for outputting an incoming voice signal from a telephone device varies with a volume set value of a speaker volume switch adjusted by an user. When the gain of the amplifier increases equal to or greater than a threshold value, a feature extraction amplification circuit performs a feature extraction amplification processing to apparently amplify output power of the incoming voice signal, and a control circuit fixes the gain of the amplifier to the threshold value regardless of the volume set value.

2 Claims, 3 Drawing Sheets

ON-BOARD HANDS-FREE COMMUNICATION APPARATUS

CROSS REFERENCE TO RELATED APPLICATION

This application is based on and incorporates herein by reference Japanese Patent Application No. 2007-27960 filed on Feb. 7, 2007.

FIELD OF THE INVENTION

The present invention relates to an on-board hands-free communication apparatus with an acoustic echo canceller.

BACKGROUND OF THE INVENTION

A hands-free communication apparatus has been proposed, for example, in JP-A-2005-198093 or US 2005/0286714 corresponding to JP-A-2006-33802. Such a hands-free communication apparatus has an echo canceller that performs an echo cancellation calculation on outgoing and incoming voice signals to reduce an acoustic echo signal contained in the outgoing voice signal. The acoustic echo originates from the fact that a part of the incoming voice signal outputted from a speaker is picked up by a microphone and transmitted back to a calling party as a part of the outgoing voice signal.

In a case where such a hands-free communication apparatus is used in a vehicle, an incoming voice signal from a calling party is amplified by an on-board power amplifier originally installed on the vehicle and then outputted from an on-board vehicle speaker originally installed on the vehicle. When a gain set value of the power amplifier is set to less than a gain threshold value, the power amplifier lineally amplifies the incoming voice signal according to the gain set value. In contrast, when the gain set value of the power amplifier is set equal to or greater than the gain threshold value, the power amplifier nonlinearly amplifies the incoming voice signal.

When the user cannot clearly hear the incoming voice signal (i.e., calling party's voice) outputted from the speaker due to surrounding noise, the user increases a volume set value of a volume switch to increase a volume of the speaker. In this case, the gain set value of the power amplifier increases with the volume set value of the volume switch and may become equal to or greater than the gain threshold value. As a result, although the user can easily hear the incoming voice signal, the incoming voice signal may be distorted due to the fact that the incoming voice signal is amplified with high gain. Due to the distortion, power of an incoming voice signal that is outputted from the speaker, picked up by a microphone, and transmitted back to the calling party as a part of an outgoing voice signal is different from power of an incoming voice signal transmitted from the calling party. Therefore, an echo canceller cannot suitably reduce an acrostic echo signal contained in the outgoing voice signal.

SUMMARY OF THE INVENTION

In view of the above-described problem, it is an object of the present invention to provide a hands-free communication apparatus that provides a clear hands-free communication by suitably reducing acrostic echo.

In accordance with an aspect of the present invention, an on-board hands-free communication apparatus includes a calculation circuit, a volume control circuit, an amplifier circuit, a control circuit, and a feature extraction amplifier circuit. The calculation circuit is configured to perform an echo cancel calculation on outgoing and incoming voice signals to and from a cell phone to reduce an acoustic echo signal contained in the outgoing voice signal. The acoustic echo signal originates from a portion of the incoming voice signal that is outputted from a speaker, picked up by a microphone, and transmitted back to the cell phone. The volume control circuit has a volume set value adjustable by an user to adjust a volume of the speaker. The amplifier circuit is coupled downstream of the speaker and has a gain set value. The amplifier circuit is configured to linearly amplify output power of the incoming voice signal according to the gain set value, when the gain set value is less than a predetermined gain threshold value. The amplifier circuit is also configured to nonlinearly amplify the output power of the incoming voice signal according to the gain set value, when the gain set value is equal to or greater than the gain threshold value. The control circuit is configured to allow the gain set value of the amplifier circuit to vary with the volume set value of the volume control circuit. The feature extraction amplifier circuit is coupled between the cell phone and the amplifier circuit and configured to selectively perform a feature extraction amplification processing that extracts a feature component of the incoming voice signal and amplifies the extracted feature component. The control circuit causes the feature extraction amplifier circuit to perform the feature extraction processing and fixes the gain set value of the amplifier circuit to the gain threshold value regardless of the volume set value, when the gain set value becomes equal to or greater than the gain threshold value.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

Figure 1:
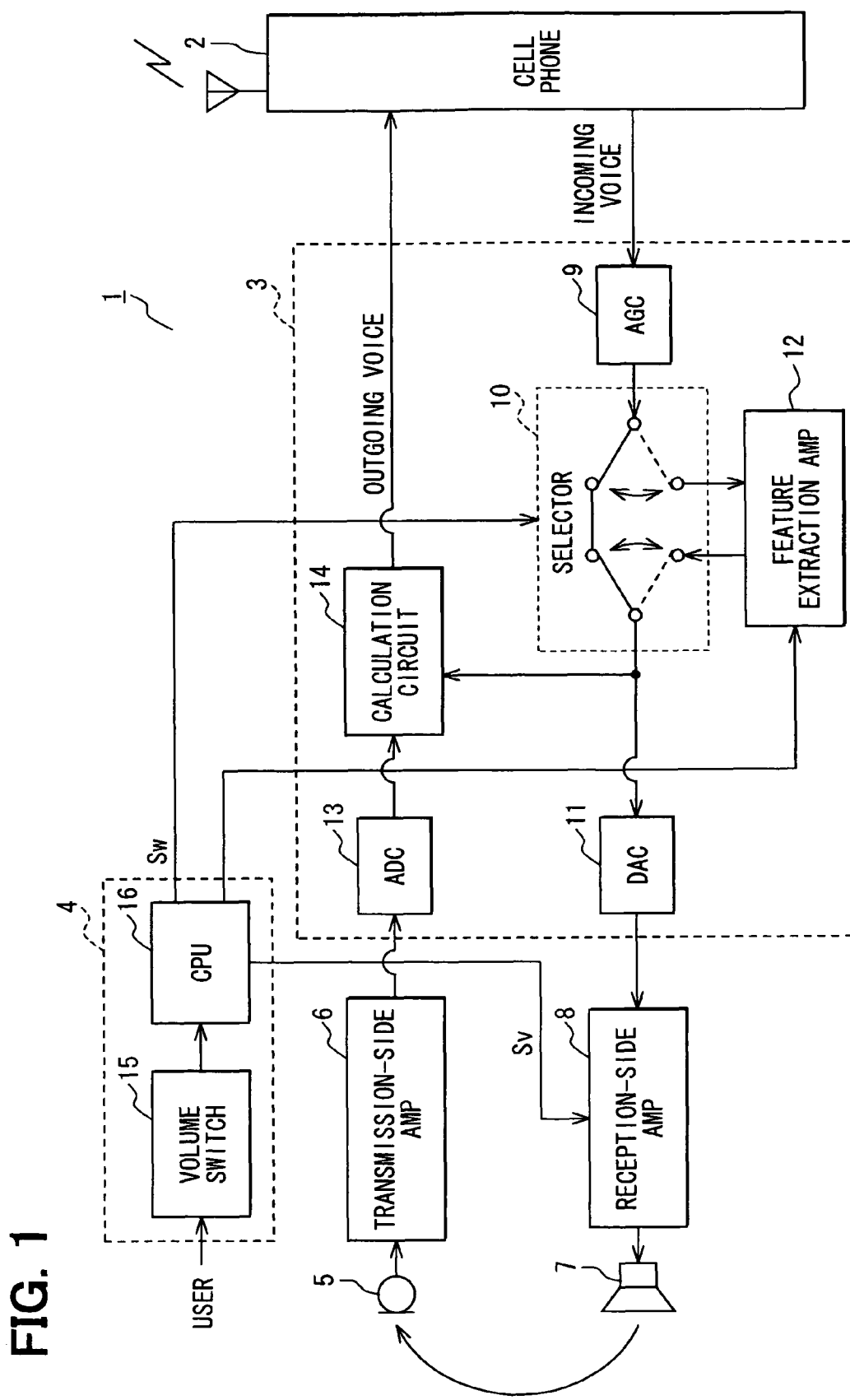
FIG. 1 is a functional block diagram illustrating an on-board hands-free communication apparatus according to an embodiment of the present invention.

Referring to FIG. 1, an on-board hands-free communication apparatus 1 according to an embodiment of the present invention includes an echo cancellation circuit 3, a volume controller 4, a transmission-side amplifier 6 that amplifies an outgoing voice signal received from a microphone 5 and outputs the outgoing voice signal to the echo cancellation circuit 3, and a reception-side amplifier 8 that amplifies an incoming voice signal received from the echo cancellation circuit 3 and outputs the incoming voice signal to a speaker 7.

The hands-free communication apparatus 1 is installed in a vehicle and wirelessly communicates with a cell phone 2, for example, via Bluetooth (registered trade mark) to allow a user to achieve hands-free conversation. The cell phone 2 transmits the outgoing voice signal received from the hands-free communication apparatus 1 to a calling party via a wide-area communications network and transmits the incoming voice signal received from the calling party through the wide-area communications network to the hands-free communication apparatus 1.

The microphone 5 is installed at a location where the microphone 5 can easily pick up (collect) voice of a user in the vehicle. For example, the microphone 5 can be installed at a headrest of a seat, a steering wheel, or a sun visor of the vehicle. The speaker 7 is installed at a location where the user in the vehicle can hear voice outputted from the speaker 7 clearly. For example, the speaker 7 can be installed at an installment panel, an interior ceiling, or an inner side of a front door of the vehicle.

The echo cancellation circuit 3 includes an automatic gain control (AGC) circuit 9, a selector switch 10, a digital-to-analog (D/A) converter 11, a feature extraction amplifier 12, an analog-to-digital (A/D) converter 13, and a calculation circuit 14. The volume controller 4 includes a volume switch 15, and a central processing unit (CPU) 16. The volume switch 15 is a dial type, for example. The user in the vehicle controls a volume of the speaker 7 by adjusting a volume set value Sv of the volume switch 15.

The automatic gain control circuit 9 automatically adjusts the strength of the incoming voice signal received from the cell phone 2 to a predetermined value. The selector switch 10 selectively switches between a first path indicated by a solid line in FIG. 1 and a second path indicated by a broken line in FIG. 1 in accordance with a switch control signal Sw received from the CPU 16 of the volume controller 4. When the selector switch 10 switches to the first path, the incoming voice signal is transmitted from the automatic gain control circuit 9 directly to the D/A converter 11 without passing through the feature extraction amplifier 12. In contrast, when the selector switch 10 switches to the second path, the incoming voice signal is transmitted from the automatic gain control circuit 9 to the D/A converter 11 by way of the feature extraction amplifier 12.

The feature extraction amplifier 12 performs a feature extraction amplification processing that extracts a feature component from the incoming voice signal and amplifies the extracted feature component. Thus, output power of the incoming voice signal is apparently amplified. In one example of the feature extraction amplification processing, the feature extraction amplifier 12 extracts formant frequency components from the incoming voice signal and amplifies the extracted formant frequency components.

Figure 2:
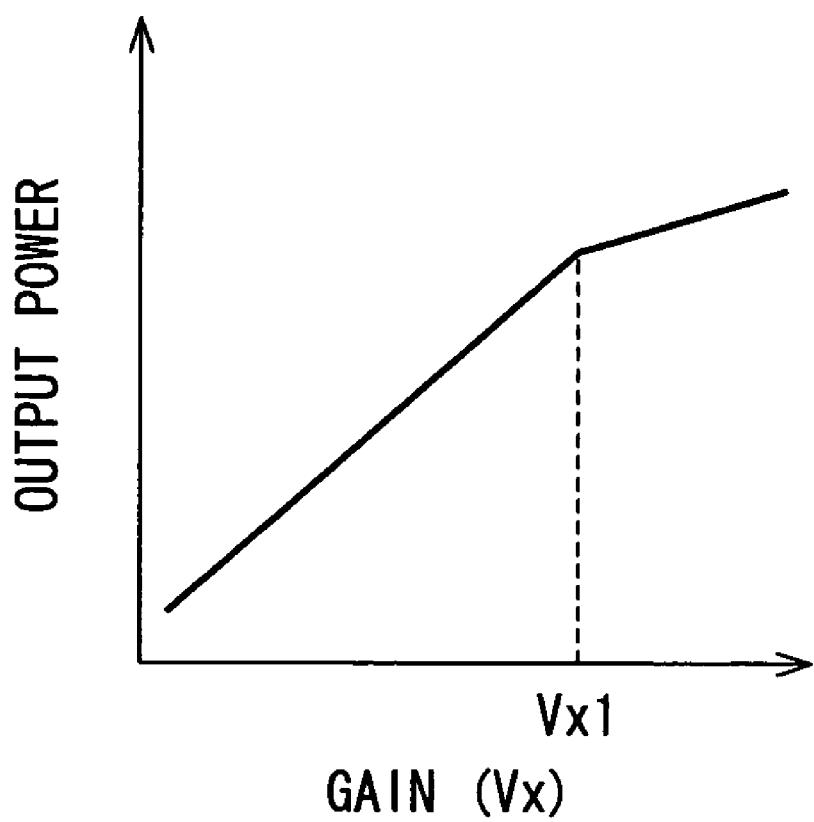
FIG. 2 is a graph illustrating a relationship between an output power of an incoming voice signal outputted from a speaker and a gain set value of a reception-side amplifier of the hands-free communication apparatus of FIG. 1.

The D/A converter 11 converts the incoming voice signal from digital to analog and outputs the incoming voice signal to the reception-side amplifier 8. The reception-side amplifier 8 is constructed from an on-vehicle power amplifier originally installed on the vehicle and amplifies the output power of the incoming voice signal according to its gain set value Vx. Specifically, as shown in FIG. 2, when the gain set value Vx of the reception-side amplifier 8 is less than a gain threshold value Vx1, the reception-side amplifier 8 linearly amplifies the output power of the incoming voice signal. In contrast, when the gain set value Vx of the reception-side amplifier 8 is equal to or greater than the gain threshold value Vx1, the reception-side amplifier 8 nonlinearly amplifies the output power of the incoming voice signal. The gain threshold value Vx1 is determined such that when the gain set value Vx is less than the gain threshold value Vx1, the voice outputted from the speaker 7 can be prevented from being distorted. In other words, when the gain set value Vx is equal to or greater than the gain threshold value Vx1, the voice outputted from the speaker 7 may be distorted. The reception-side amplifier 8 receives the volume set value Sv of the volume switch 15 from the CPU 16 of the volume controller 4. The gain set value Vx of the reception-side amplifier 8 can vary with the volume set value Sv of the volume switch 15.

The transmission-side amplifier 6 amplifies the outgoing voice signal received from the microphone 5 and outputs the outgoing voice signal to the A/D converter 13. The A/D converter 13 converts the outgoing voice signal from analog to digital and outputs the outgoing voice signal to the calculation circuit 14.

The calculation circuit 14 receives the outgoing voice signal from the A/D converter 13. Further, the calculation circuit 14 receives the incoming voice signal, which is transmitted from the cell phone 2 by way of the automatic gain control circuit 9 and the selector switch 10. The calculation circuit 14 performs an echo cancel calculation on the outgoing and incoming voice signals to reduce an acoustic echo signal contained in the outgoing voice signal transmitted to the cell phone 2. The acoustic echo signal originates from the fact that a part of the calling party's voice outputted from the speaker 7 is picked up by the microphone 5 as well as the user's voice.

Figure 3:
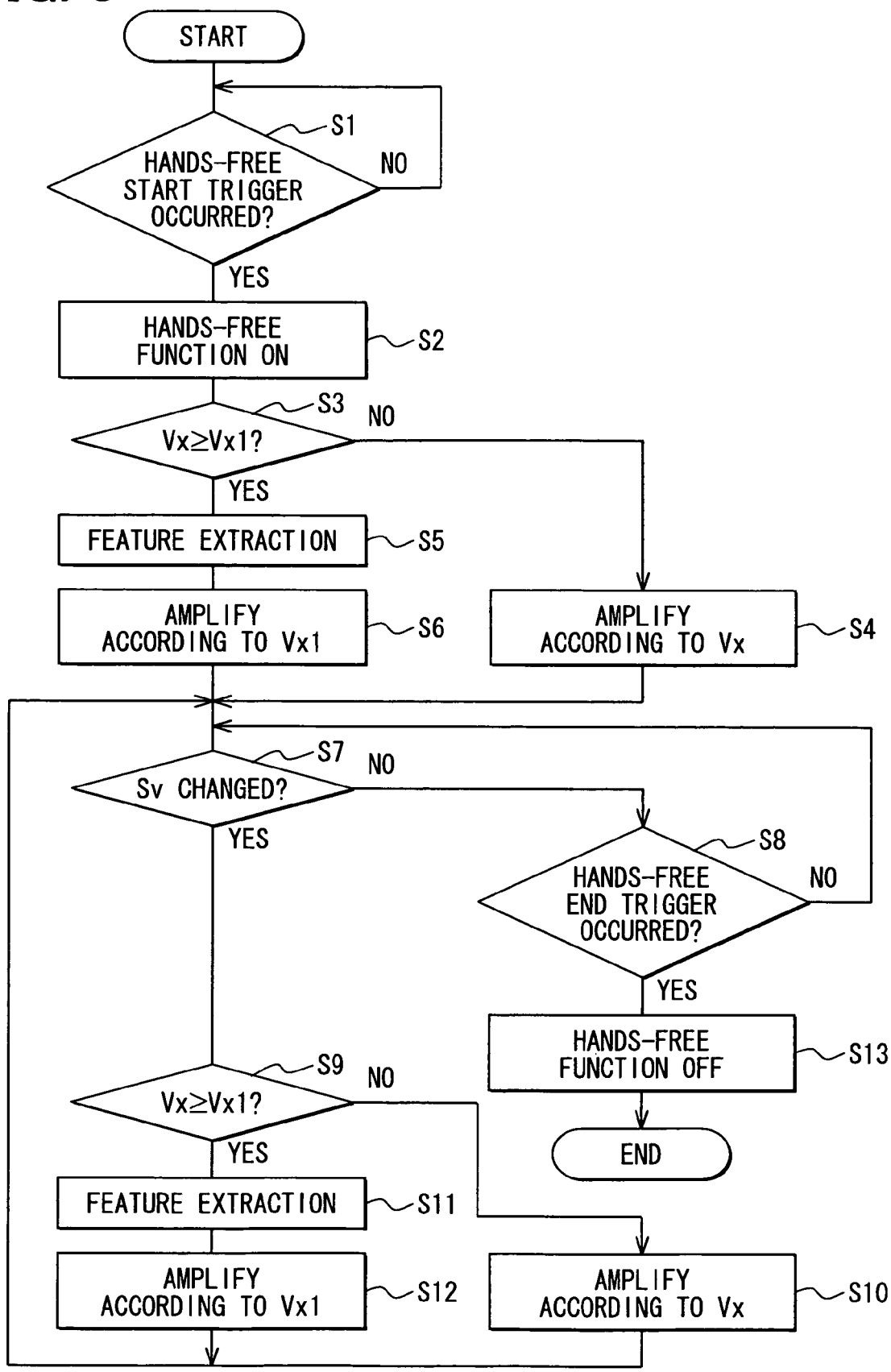
FIG. 3 is a flow diagram illustrating a process performed by a volume controller of the hands-free communication apparatus of FIG. 1.

The CPU 16 of the volume controller 4 executes a process illustrated by a flow diagram of FIG. 3. The process starts at step S1, where the CPU 16 determines whether a hands-free conversation trigger event occurs. For example, the trigger event occurs, when the user pushes a hands-free conversation start button (not shown). If the CPU 16 determines that the trigger event occurs corresponding to YES at step S1, the process proceeds to step S2, where the CPU 16 enable a hands-free function. If the CPU 16 does not determine that the trigger event occurs corresponding to NO step S1, the process repeats step S1 until the trigger event occurs.

After step S2 is finished, the process proceeds to step S3, where the CPU 16 receives the gain set value Vx and compares the gain set value Vx with the gain threshold value Vx1. If the CPU 16 determines that the gain set value Vx is less than the gain threshold value Vx1 corresponding to NO at step S3, the process proceeds to step S4, where the CPU 16 causes the selector switch 10 to switch to the first path. Further, at step S4, the CPU 16 causes the gain set value Vx of the reception-side amplifier 8 to vary with the volume set value Sv of the volume switch 15 at the time. Thus, the reception-side amplifier 8 amplifies the output power of the incoming voice signal, which is received from the cell phone 2 by way of the echo cancellation circuit 3, according to the gain set value Vx dependent on the volume set value Sv of the volume switch 15.

If the CPU 16 determines that the gain set value Vx of the reception-side amplifier 8 is equal to or greater than the gain threshold value Vx1 corresponding to YES at step S3, the process proceeds to step S5. At step S5, the CPU 16 causes the selector switch 10 to switch to the second path so that the feature extraction amplification processing is applied to the incoming voice signal by the feature extraction amplifier 12. Then, the process proceeds to step S6, where the CPU 16 causes the gain set value Vx to be equal to the gain threshold value Vx1. Thus, the reception-side amplifier 8 amplifies the output power of the incoming voice signal, which is received from the cell phone 2 by way of the echo cancellation circuit 3, according to the gain threshold value Vx1 independent of the volume set value Sv of the volume switch 15.

After step S4 or step S6 is finished, the process proceeds to step S7, where the CPU 16 determines whether the volume set value Sv of the volume switch 15 is changed by the user. If the CPU 16 determines that the volume set value Sv remains unchanged corresponding to NO at step S7, the process proceeds to step S8. At step S8, the CPU 16 determines whether a hands-free conversation end trigger occurs. For example, the end trigger occurs when the user pushes a hands-free conversation end button (not shown). If the CPU 16 determines that the end trigger occurs corresponding to YES at step S8, the process proceeds to step S13, where the CPU 16 disables the hands-free function. After step S13 is finished, the process is completed. If the CPU 16 does not determine that the end trigger occurs corresponding to NO at step S8, the process returns to step S7.

If the CPU 16 determines that the volume set value Sv of the volume switch 15 is changed by the user corresponding to YES at step S7, the process proceeds to step S9. At step S9, the CPU 16 compares the gain set value Vx corresponding to the changed volume set value Sv with the gain threshold value Vx1. If the CPU 16 determines that the gain set value Vx corresponding to the changed volume set value Sv is less than the gain threshold value Vx1 corresponding to NO at step S9, the process proceeds to step S10, where the CPU 16 causes the selector switch 10 to switch to the first path. Further, at step S10, the CPU 16 causes the gain set value Vx to vary with the changed volume set value Sv of the volume switch 15. Thus, the reception-side amplifier 8 amplifies the output power of the incoming voice signal, which is received from the cell phone 2 by way of the echo cancellation circuit 3, according to the gain set value Vx dependent on the changed volume set value Sv of the volume switch 15. After step S10 is finished, the process returns to step S7.

If the CPU 16 determines that the gain set value Vx corresponding to the changed volume set value Sv is equal to or greater than the gain threshold value Vx1 corresponding to YES at step S9, the process proceeds to step S11. At step S11, the CPU 16 causes the selector switch 10 to switch to the second path so that the feature extraction amplification processing is applied to the incoming voice signal by the feature extraction amplifier 12. Then, the process proceeds to step S12, where the CPU 16 causes the gain set value Vx to be equal to the gain threshold value Vx1. Thus, the reception-side amplifier 8 amplifies the output power of the incoming voice signal, which is received from the cell phone 2 by way of the echo cancellation circuit 3, according to the gain threshold value Vx1 independent of the changed volume set value Sv of the volume switch 15. After step S12 is finished, the process returns to step S7.

As described above, according to the present embodiment, when the gain set value Vx of the reception-side amplifier 8 increases equal to or greater than the gain threshold value Vx1, the gain set value Vx is fixed to the gain threshold value Vx1 regardless of the volume set value Sv. In this case, the feature extraction amplifier 12 performs the feature extraction amplification processing on the incoming voice signal, which is transmitted from the cell phone 2 to the reception-side amplifier 8. Thus, the output power of the incoming voice signal is apparently amplified. In such an approach, the reception-side amplifier 8 amplifies the output power of the incoming voice signal according to the gain threshold value Vx1 independent of the volume set value Sv so that the voice outputted from the speaker 7 can be prevented from being distorted. As a result, the user can hear the voice outputted from the speaker 7 clearly. Further, since the acoustic echo signal contained in the outgoing voice signal has no distortion, the calculation circuit 14 can suitably remove the acoustic echo signal from the outgoing voice signal.

In contrast, when the gain set value Vx of the reception-side amplifier 8 decreases below the gain threshold value Vx1, the gain set value Vx is caused to vary with the volume set value Sv. In such an approach, the reception-side amplifier 8 amplifies the output power of the incoming voice signal according to the gain set value Vx dependent on the volume set value Sv. Since the gain set value Vx is less than the gain threshold value Vx1, the voice outputted from the speaker 7 can be prevented from being distorted. As a result, the user can hear the voice outputted from the speaker 7 clearly. Further, since the acoustic echo signal contained in the outgoing voice signal has no distortion, the calculation circuit 14 can suitably remove the acoustic echo from the outgoing voice signal.

(Modifications)

The embodiment described above may be modified in various ways. For example, the hands-free communication apparatus 1 can be wired to the cell phone 2, although the hands-free communication apparatus 1 wirelessly communicates with the cell phone 2 in the embodiment.

Such changes and modifications are to be understood as being within the scope of the present invention as defined by the appended claims.

What is claimed is:

1. An on-board hands-free communication apparatus comprising:

means for performing a calculation on an incoming voice inputted from telephone means and a portion of an output voice outputted from voice output means, the portion of the output voice being returned back and inputted to voice input means as part of an input voice, the performing means outputting an outgoing voice to the telephone means by reducing echo in the input voice;

means for setting a volume set value, the setting means being operated by a user;

means for amplifying an output power of the incoming voice according to a setting value, the amplifying means linearly amplifying the output power of the incoming voice when the setting value is less than a threshold value, the amplifying means nonlinearly amplifying the output power of the incoming voice when the setting value is equal to or greater than the threshold value;

means for changing the setting value of the amplifying means according to the volume set value so that the output power of the incoming voice inputted to the amplifying means from the telephone means is amplified by the amplifying means to a power corresponding to the setting value; and means for selectively performing a feature extraction amplification processing on the incoming voice inputted to the amplifying means from the telephone means, the feature extraction amplification processing extracting only a feature component of the voice by extracting a formant frequency component and by removing a frequency component other than the formant frequency component, the feature extraction amplification processing amplifying the extracted feature component, wherein when the setting value is equal to or greater than the threshold value, the changing means causes the feature extraction amplification means to perform the feature extraction amplification processing on the incoming voice inputted to the amplifying means from the telephone means so as to fix the setting value of the amplifying means to the threshold value without changing the setting value according to the volume set value, so that the output power of the incoming voice inputted to the amplifying means from the telephone means is amplified by the amplifying means to the power corresponding to the threshold value.

2. The on-board hands-free communication apparatus according to claim 1, wherein when the setting value of the amplifying means is less than the threshold value, the changing means changes the setting value according to the volume set value without causing the performing means to perform the feature extraction amplification processing on the incoming voice inputted to the amplifying means from the telephone means, so that the output power of the incoming voice inputted to the amplifying means from the telephone means is amplified by the amplifying means to the power corresponding to the setting value.

* * * * *